3,039,883
PROCESS FOR PREPARING DEHYDRATED MASHED POTATOES

Rudolph Kodras, Skokie, Ill., assignor to International Minerals & Chemical Corporation, a corporation of New York
No Drawing. Filed June 20, 1958, Ser. No. 743,484
6 Claims. (Cl. 99—207)

The present invention relates to the dehydration of potatoes. More particularly, it relates to a method for producing dehydrated potatoes of improved physical and organoleptic properties.

The development of a satisfactory method for preparing mashed potatoes in dehydrated form has been the subject of extensive research work for several decades. A variety of methods have been developed, employing a wide range of processing techniques and conditions. All of the methods, however, have been deficient in one respect or another—viz., the dried material is of undesirably low bulk density or of poor storage properties, or the rehydrated product is deficient in flavor, color, and/or texture. The present invention is a method for producing a product of high bulk density, good storage properties, and excellent organoleptic properties. One object of the invention is to improved the dehydration of potatoes.

Another object is to prepare dehydrated mashed potatoes of high bulk density.

Another object is to prepare dehydrated mashed potatoes of superior physical form and ready rehydratability.

Another object is to prepare dehydrated mashed potatoes in porous, granular form, capable of being rehydrated readily into a mashed potato product closely resembling fresh mashed potatoes.

Other objects of the invention will be apparent from the following description.

In accordance with the invention, potatoes are cooked until capable of being readily mashed, are then cooled and aged at a relatively low temperature, mashed in water to a thin slurry, separated from the liquid phase, and dried. During the low-temperature aging operation after cooking but before mashing, the potatoes appear to undergo alteration in some unascertained manner, as a result of which they are readily mashed in water without objectionable rupture of cells, and are converted thereby into a slurry which is readily filtered. The resulting solids dry readily, forming particles or granules of high bulk density which are readily rehydrated to form a mashed potato product of superior quality.

For use in the invention, potatoes are cooked under conditions to gelatinize the starch therein, while avoiding rupture of the starch granules. Small potatoes may be cooked whole, if desired, with or without peeling. Larger potatoes are preferably peeled, then sliced into pieces around ½ to ⅝ inch in thickness. Peeled and/or sliced potatoes should be washed in cold water to remove any non-adherent starch which would otherwise tend to give a pasty product. The potatoes or potato slices can suitably be cooked by steaming for around 30 to 40 minutes at ordinary pressure and at about 212° F. Alternatively, they may be cooked in two steps, first in a water bath, suitably at a temperature between about 160 and about 175° F. for about 25 to about 35 minutes, the time varying inversely with the temperature, then in steam at ordinary pressure for a period of about 12 to about 20 minutes.

After the cooking operation, the potatoes are cooled to a temperature below about 60° F. and above the freezing point, preferably between about 32 and about 40° F., and are held at a temperature within this range for a period of about 1 hour to about 24 hours or longer, preferably around 10 to 20 hours.

The cooked potatoes, after being aged at low temperature, are mashed in water to form a thin aqueous slurry. They may, for example, be commingled with water in a slow-speed mixer, suitably a mixer which operates by a mashing or kneading action (e.g., a pug mill, a muller, or a ribbon mixer), with a minimum of shearing action. They may be passed between drums or rolls while being sprayed with water, or preferably while submerged in water. Numerous types of apparatus suitable for this purpose are described in the art. The resulting slurry is readily filtered, centrifuged, or otherwise treated to separate the solid phase from the liquid phase.

The solids, ordinarily containing between about 75 and about 90% moisture, are readily extruded into small pellets or broken up into small crumb-like granules, which can be dried by conventional means. The granules may, for example, be passed through a heated, rotating cylindrical dryer countercurrent to a stream of hot air. Alternatively, they may be deposited upon a moving screen passing through a drying oven in contact with hot air. As a further alternative, they may be dropped downward through a drying column countercurrent to an upward moving stream of hot air. As a modification of the latter technique, the potato particles can be fed into a fluidized bed of potato particles, the fluidization being maintained by a current of hot air flowing upward through the bed, and the drying being effected simultaneously by the fluidizing stream of air. The drying may be carried out over a wide range of temperatures, from about 75 to about 250° F., and the time required for drying will, of course, vary inversely with the temperature, other factors being constant. Products of highest bulk density are generally obtained at the higher drying temperatures— e.g., from about 175 to about 250° F. The drying operation will generally require an exposure time of about 30 minutes to about 24 hours, depending upon the relative humidity and the temperature of the drying gas and the water content of the original potato particles.

The product of the invention comprises small particles or granules ranging in bulk density from about 0.4 to about 0.6 gram per cubic centimeter and occasionally as high as about 1.0 gram per cubic centimeter, and having a water content below 12% by weight, dry basis, preferably between about 5 and about 10%. The product is readily rehydrated to a mashed potato composition of pleasing taste and texture merely by stirring with hot water and/or milk.

The invention will be more readily understood from the following operating examples.

Example 1

Small Idaho Russet potatoes averaging about 150 grams in weight were steamed at atmospheric pressure for 35 minutes, then transferred to a refrigerator at about 35° F. and held for 14 hours. At the end of this time they were removed from the refrigerator and allowed to stand at room temperature for 7 hours. They were then mashed to a thin slurry in distilled water at room temperature, collandered, filtered, broken up into small granules, and dried in a vertical column with a stream of warm (100° F.) air over a period of 3 hours. The product was a white, crystalline material containing many small granules and having a bulk density of 0.4 gram per cubic centimeter. It rehydrated readily into a potato product of good taste, texture, and color.

Example 2

Small Idaho Russet potatoes averaging 150 grams in weight were cooked in steam at atmospheric pressure for 35 minutes, and were then stored in a refrigerator at around 35° F. for one week. At the end of this time, the potatoes were mashed thoroughly with water in the proportion of 0.5 kilogram of potatoes per liter. For this purpose, one-half hour was required. The resulting slurry filtered very rapidly. The filtration solids were not sticky to the touch, and dried readily under the conditions employed in Example 1. The product was a granular material having a bulk density of 0.4 gram per cubic centimeter, and yielding a highly desirable type of product on being rehydrated.

For comparison, the foregoing test was repeated, except that the refrigeration period was omitted. The aqueous potato slurry proved to be very sticky, and would not filter at all.

While the invention has been described with reference to certain specific processing techniques and conditions, it is to be understood that such matters are illustrative only and not by way of limitation. For instance, the invention is applicable broadly to the treatment of white or "Irish" potatoes (i.e., potatoes of the genus Solanum). Numerous modifications and equivalents of the invention will be apparent from the foregoing description to those skilled in the art.

The following claims particularly point out and distinctly claim the subject matter of the invention:

1. In a process for producing dehydrated potatoes in a form readily rehydratable into a mashed potato product, wherein potatoes are cooked, mashed, and dried, the improvement which comprises aging the cooked potatoes, prior to mashing, at a temperature below about 60° F. and above the freezing point thereof for a period of at least about one hour, then mashing in water to form a slurry, and separating the liquid phase therefrom before drying, whereby the bulk density of the dehydrated product is substantially increased.

2. A process as in claim 1 wherein said aging is carried out at a temperature between about 32 and about 40° F. for a period of about 1 to about 24 hours.

3. An improved process for producing dehydrated potatoes of high bulk density and in a form readily rehydratable into a mashed potato product of superior properties which comprises cooking potatoes until readily mashable, cooling the cooked potatoes to a temperature below about 60° F. and above the freezing point thereof and holding at said temperature for a period of about 10 to about 20 hours, mashing the potatoes with water in a proportion to form a thin slurry, separating the liquid phase therefrom, and drying the solid phase at a temperature between about 75 and about 250° F.

4. An improved process for producing dehydrated potatoes having a bulk density of at least about 0.4 gram per cubic centimeter and in a form readily rehydratable into a mashed potato product of superior physical and organoleptic properties, which comprises cooking potatoes until readily mashable, cooling the cooked potatoes to a temperature between about 32 and about 40° F. and holding at said temperature for about 10 to about 20 hours, mashing the potatoes with water in a proportion to form a thin slurry, filtering the resulting slurry, breaking up the resulting filter cake into small granules, and drying the granules in air at a temperature between about 175 and about 250° F. to a moisture content below about 12% by weight, dry basis.

5. An improved process for producing dehydrated potatoes of high bulk density and in a form readily rehydratable into a mashed potato product of superior properties which comprises steaming potatoes at around 212° F. for a period of about 30 to about 40 minutes, cooling to a temperature below about 60° F. and above the freezing point thereof and holding at said temperature for a period of about 1 to about 24 hours, mashing the potatoes with water in a proportion to form a thin slurry, separating the liquid phase therefrom, and drying the solid phase.

6. An improved process for producing dehydrated potatoes of high bulk density and in a form readily rehydratable into a mashed potato product of superior properties, which comprises partially cooking potatoes in a water bath at about 160 to about 175° F. for about 25 to about 35 minutes, draining and further cooking the potatoes in steam at about atmospheric pressure for about 12 to about 20 minutes, cooling to a temperature below about 60° F. and above the freezing point thereof and holding at said temperature for about 1 to about 24 hours, mashing the potatoes with water in a proportion to form a thin slurry, separating the liquid phase therefrom, and drying the solid phase.

References Cited in the file of this patent

UNITED STATES PATENTS

| 2,490,431 | Greene et al. | Dec. 6, 1949 |
| 2,520,891 | Rivoche | Aug. 29, 1950 |
| 2,564,296 | Bostock | Aug. 14, 1951 |

FOREIGN PATENTS

| 542,125 | Great Britain | Dec. 29, 1941 |